UNITED STATES PATENT OFFICE.

CHARLES LEGG, OF MALCOM, ASSIGNOR OF ONE-HALF HIS RIGHT TO HARRISON W. WIGTON, OF DE SOTO, IOWA.

IMPROVEMENT IN COMPOSITIONS FOR MOLDING PLASTIC ARTICLES.

Specification forming part of Letters Patent No. 136,658, dated March 11, 1873.

*To all whom it may concern:*

Be it known that I, CHARLES LEGG, of Malcom, in the county of Poweshiek and State of Iowa, have invented a certain Improved Stove-Pipe Safe and Ventilator, of which the following is a specification:

The object of my invention is to provide a new composition, that may be molded in a plastic state to form solid stove-pipe safes and other articles designed for non-conductors of heat.

It consists in mixing the following-named substances in the manner hereinafter fully set forth: To make a stove-pipe safe, take one (1) pound of alum and two (2) ounces of sulphate of copper (blue vitriol) and dissolve them together in water. Stir into this solution sufficient plaster of Paris to form a plastic compound stiff enough to be pressed into a mold. Let it remain in the mold until dry and hard.

Any common form of collar or safe for stove-pipes can be thus molded complete in one piece or in sections, as may be desired. The composition can also be advantageously used for covering boilers and flues.

Claim.

I claim—

A composition for stove-pipe safes and other non-conductors of heat, prepared of the materials and proportions named, and in the manner set forth.

CHARLES LEGG.

Witnesses:
   E. M. GILES,
   I. F. CARTER.